Aug. 30, 1938.  R. P. RASMUSSEN  2,128,594
CONVEYER
Filed May 24, 1935  3 Sheets-Sheet 1
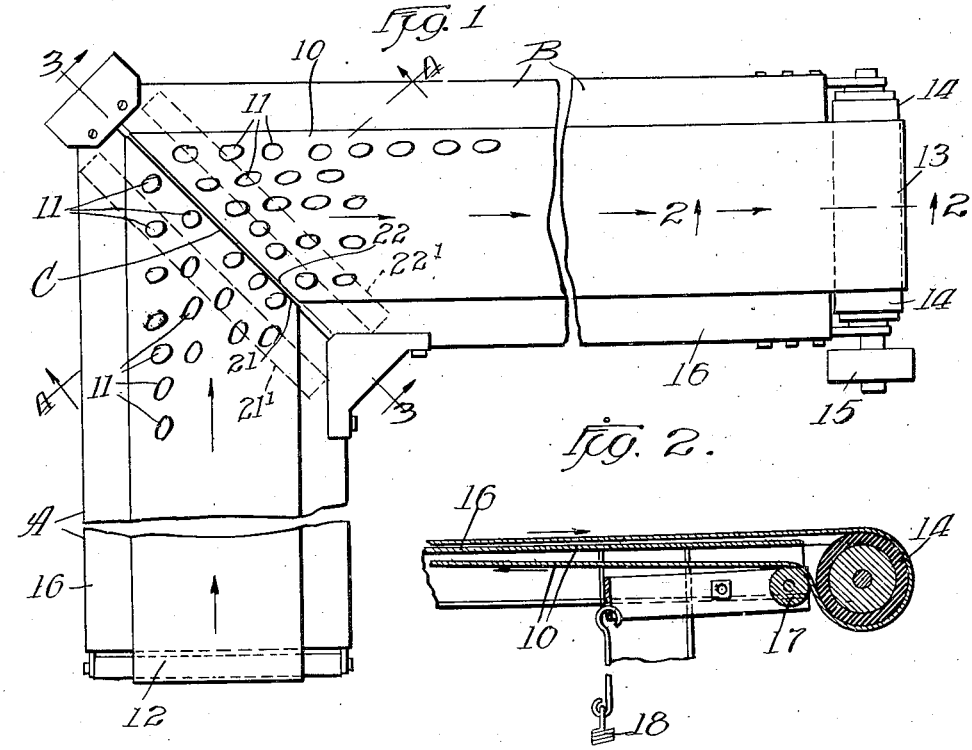
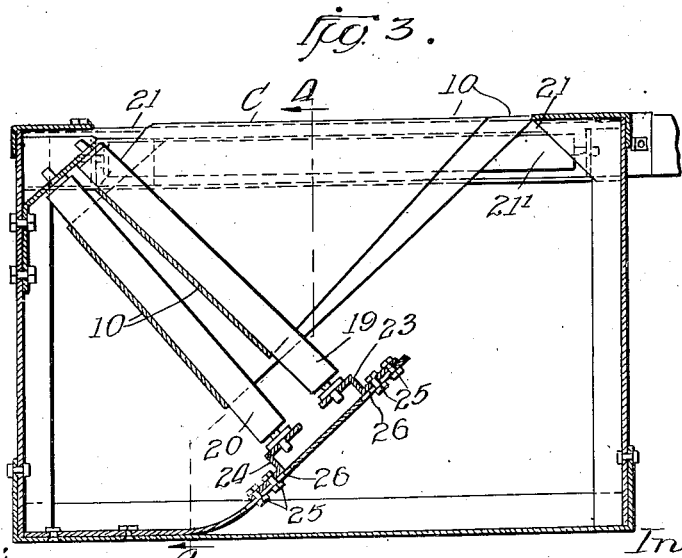
Witness:
Harry R. L. White
Inventor:
Robert P. Rasmussen
By Edward Fay Wilson
Atty.

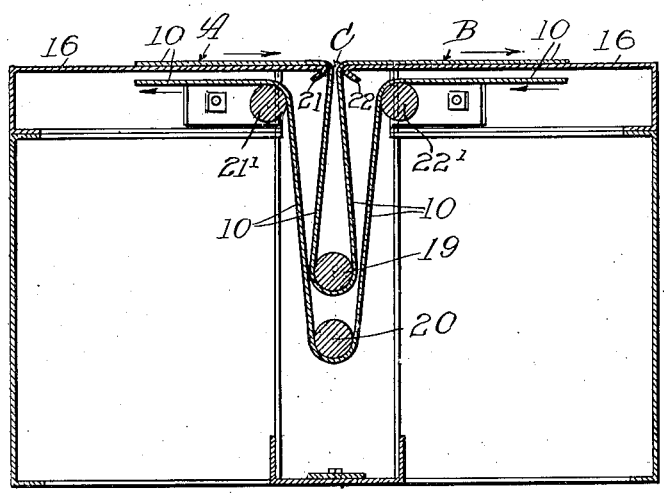
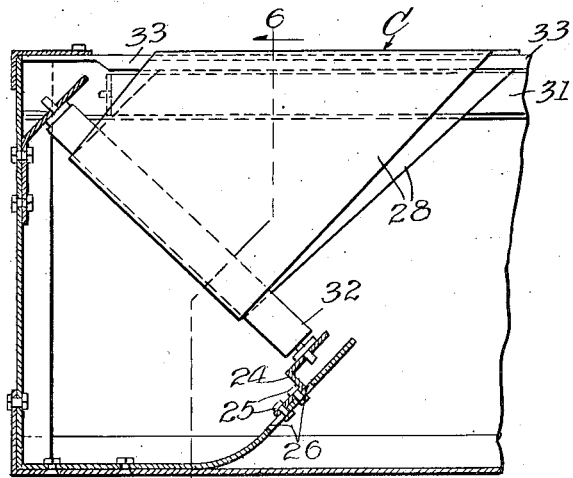
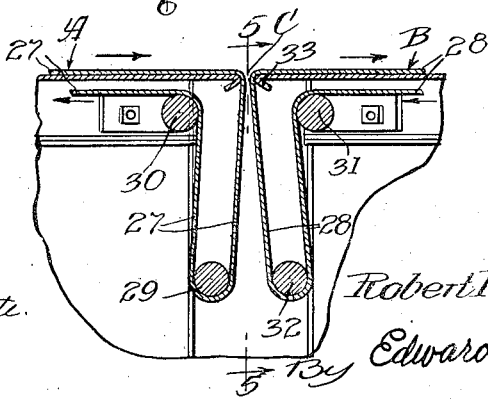

Aug. 30, 1938.   R. P. RASMUSSEN   2,128,594
CONVEYER
Filed May 24, 1935   3 Sheets-Sheet 3
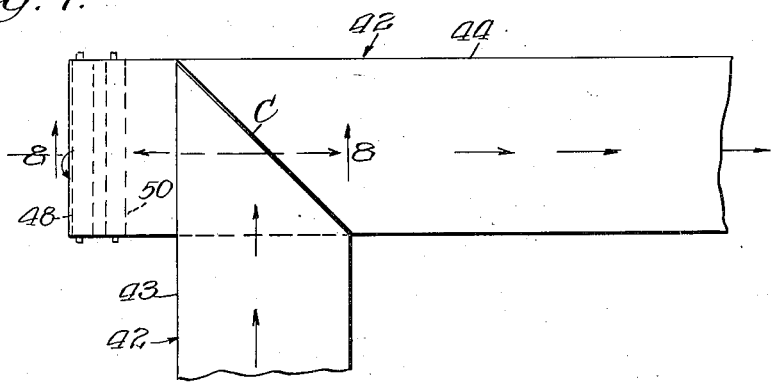
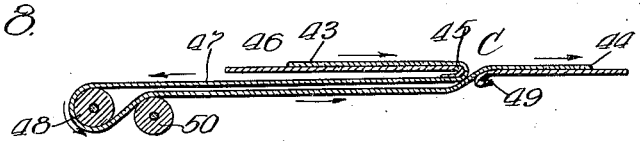
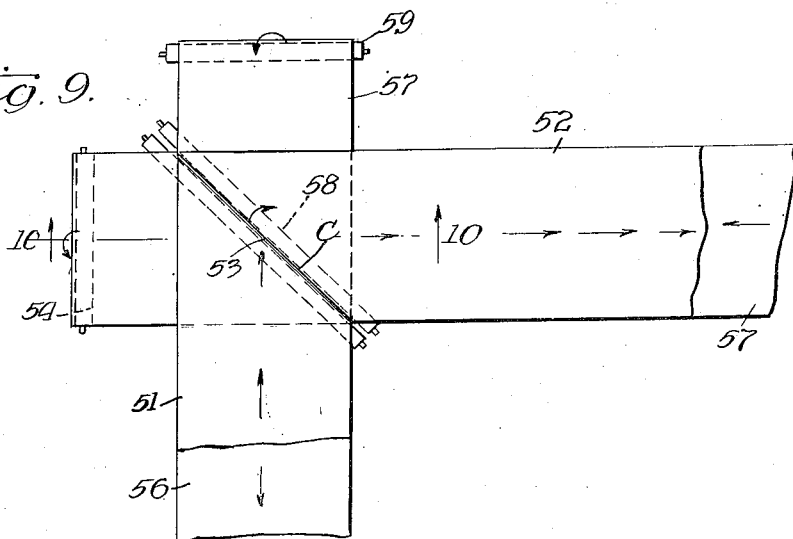
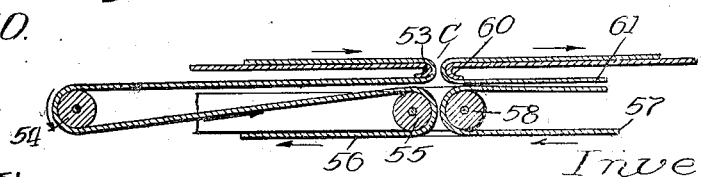
Witness:
Harry R. L. White
Inventor:
Robert P. Rasmussen
By Edward Jay Wilson
Atty.

Patented Aug. 30, 1938

2,128,594

UNITED STATES PATENT OFFICE 2,128,594

CONVEYER

Robert P. Rasmussen, Chicago, Ill.

Application May 24, 1935, Serial No. 23,229

7 Claims. (Cl. 198—184)

This invention relates to improvements in conveyer belt systems and has special reference to a conveyer system by which articles which are being carried along one line of movement are changed to a line of travel at an angle thereto.

Such a system is especially adapted for giving the articles, such as pieces of candy in the process of making, a progressive movement of a required distance under conditions of limitation of space or for other reasons which preclude the required amount of travel in one direction only.

The invention is particularly useful in a conveyer system especially adapted for use in candy factories which having cooling tunnels for use particularly in the manufacture of coated chocolates which require a travel of a certain minimum distance before they can be removed from the conveyer for packing, and where the space in which the tunnel has to be erected does not permit a travel of a sufficient distance in one direction to properly cool and harden the chocolates.

In the production of many articles such as coated chocolates, it is necessary to keep the individual pieces upright on the conveyer until they are removed by the packers and it is a special object of the invention to provide such direction turning means as to avoid all possibility of the articles being tipped over when the conveyer turns a corner.

The invention resides in a conveyer system by which means are provided for moving articles, such as dipped chocolates, in a specified direction in a definite plane and without materially changing the plane of movement, changing the direction of movement. For example, moving the articles in one direction and at a given point in their movement, changing the direction of movement to one at right angles to the first direction of movement, and maintaining the travel in substantially the same plane before and after the change of direction.

I have found that what appears to be the most simple embodiment of the invention consists of a single continuous conveyer belt arranged horizontally and the upper stretch of same arranged to provide a substantially horizontal supporting surface. At the connecting line between the two directions of travel the initial portion of the belt is directed down away from the plane of travel, and the second portion, that is the portion travelling in the new direction, is directed up into the plane of travel. At the line where the first portion is guided down and the second portion is guided up, the two portions are brought as closely together as possible on a line which, when the two portions are of the same width, divides the angle between the two lines of travel. For instance, if the direction of travel changes 90 degrees, then the line between the adjacent ends of the two portions would be at 45% to the direction of travel of both portions.

As it is usually most convenient to arrange the conveyer so that the returning or under stretch of the conveyer is positioned underneath the upper stretch throughout its extent of travel, this lower stretch has to turn the corner the same as the upper stretch, and this condition sometimes requires more vertical space at the turn than is available. Under such conditions two conveyers, one for each direction of travel may be used. However, in both forms the conveying surface travels in substantially the same plane before and after the turn in direction. There are special advantages inherent in both embodiments of the invention, such for instance, in the continuous form, the simplicity of driving the conveyer, and in the second, the reduction of vertical height required at the turn and the possibility of driving the two portions at different speeds.

To accomplish the above mentioned and other advantages, the invention consists in the means herein fully disclosed and particularly pointed out in the appended claims, the accompanying drawings, forming part of this specification and the following description setting forth in detail, two embodiments exemplifying the invention, such disclosed arrangement of parts, devices and combinations thereof constituting, however, but two of various applications of the principle of the invention.

The invention will be more readily understood by reference to said drawings in which:—

Fig. 1, is a fragmentary top plan view of a conveyer including a continuous conveyer belt and showing a right angle turn;

Fig. 2, is a fragmentary vertical section on the line 2—2 of Fig. 1;

Fig. 3 is a fragmentary vertical transverse section on the line 3—3 of Fig. 1;

Fig. 4 is a vertical section on the line 4—4 of Figs. 1 and 3;

Fig. 5 is a vertical section similar to Fig. 3 on the line 5—5 of Fig. 6 and showing a form of the invention which includes a separate conveyer belt for each section instead of a single continuous conveyer belt for both sections;

Fig. 6 is a fragmentary vertical section on the line 6—6 of Fig. 5;

Fig. 7 is a fragmentary top plan view of a single belt conveyer, the corner turning mechanism arranged to require a relatively small vertical space;

Fig. 8 is a fragmentary, vertical section on the line 8—8 of Fig. 7;

Fig. 9 is a fragmentary top plan view of a two belt conveyer arranged to turn a corner, the corner turning mechanism, similarly to the form shown in Fig. 7, requiring a minimum of vertical space; and Fig. 10 is a fragmentary vertical section on the line 10—10 of Fig. 9.

In said drawings 10 represents a flat relatively wide conveyer belt such as is used especially in the cooling of coated chocolates and in connection with cooling tunnels such as are commonly used in the manufacture of candy and other articles.

While I have described the invention as especially adapted to the manufacture of coated chocolates and the like, it should be understood that my invention will find practical application in many situations where it is desirable to change the direction of travel and yet maintain the carried articles in upright position.

Referring first to the form of the invention as shown in Figs. 1 to 4, inclusive, the conveyer belt 10 extends in a straight line as seen in the section A of the conveyer and at B it is shown as travelling in a line at right angles to the direction of travel in the first or A section and the direction of travel is changed at the diagonal line C.

The conveyer belt 10 is supposed to receive the articles, such as the pieces of candy 11 at the beginning end 12 of the section A and carry them toward the further end of the section B, unless they are removed for packing before they reach the delivery end.

Ordinarily such a belt extends straight away, but as has been explained it sometimes occurs that there is not room enough for such an installation and, in order to obtain a sufficient length of travel it is necessary to turn a corner and extend the belt in another direction.

It might even be desirable under certain conditions to make use of two right angle turns and extend the delivery end of the belt finally back along side of the first part or extend it on in the same direction. Or in other installations it might be necessary to make a turn of the conveyer belt at a different angle than a right angle, to all of which modifications it will be readily seen the invention may be readily adapted.

The essential feature in all of the modifications or adaptations is that, if it is desired, the tops of the sections can be arranged in substantially the same plane so that the articles carried will not tip over at the turn. On the other hand it will also be seen that the invention readily adapts itself to the production of two or more section conveyers with a second section at a lower level than a first section and by means of which conveyed articles can be caused to tip over in being transferred from one section to another, either in a straight line travel or in a divergence of the line of travel.

The belt 10 as shown in Fig. 1, travels in the direction of the arrows thereon and is drawn along by a drive roll 14 at the delivery end 13, which is driven by any suitable means such as is indicated by a belt pulley 15 secured on the shaft of the roller 14.

Beneath the belt 10 is a stationary plate 16 along which the belt slides and the belt 10 returns beneath the plate 16. Adjacent to the drive roller 14 is an adjustable tightening roller 17 which serves to hold the conveyer belt taut. The tightening roller may be yieldingly held against the belt 10 by any suitable means such as by the counterweight 18.

In order to turn the corner at the line C, I arrange guide rollers beneath the belt around which I train the belt to cause it to travel in the new direction and be maintained taut at all times.

These guide rollers as best shown in Figs. 3 and 4, consist of one guide roller 19 for the top stretch of the belt and a second roller 20 below the roller 19 for the lower or return stretch of the belt.

As best shown in Fig. 4, the section A of the conveyer belt, as it reaches the line C dividing the sections A and B is directed downwardly around a relatively sharp guide member 21 and the second section B is guided up around a similar sharp guide member 22 so that the two sections at the turn will be close enough together to cause the articles being conveyed to be transferred from one section, where they are travelling in one direction, to the other section, where they travel in the new direction, without being tipped over. It will be obvious that by lowering the guide member 22 of the delivery section enough below the guide member 21 of the first section and according to the articles being conveyed, I can cause them to fall over on their sides. This would be advantageous in conveying and working upon boxes or packages for instance or for other articles.

In turning such a corner as shown at C, there will be a certain amount of slack belt to be taken care of more at the inner end of the corner than at the outer end thereof and I compensate or care for such difference by mounting the guide rollers 19 and 20 on suitable angles to the vertical as best shown in Fig. 3.

As it is difficult to set the guide rollers 19 and 20 permanently in position to accurately guide the conveyer 10 and keep its side edges truly in line at the turn, I make the guide rollers 19 and 20 adjustable as to vertical angularity by mounting one end of each in a vertical adjustable bearing as shown at 23 and 24 by any suitable means such as the bolts 25 and slots 26.

For properly guiding the under or return parts of the conveyer at the turn, I arrange guide rollers 21' and 22' substantially parallel to the meeting line C. These guide rollers 21' and 22' are thus inclined horizontally, similarly to the inclination of the meeting edges of the two sections.

In operation, the stretch A of the belt 10 travels towards the turn and at the turn is guided downwardly out of the plane of travel. At this point the stretch B is guided up into the plane of travel and carries the articles in the new direction.

In Figs. 5 and 6 there is shown a slight modification of the invention, in which instead of a single continuous conveyer belt, the stretch A is constituted of one belt 27 and the stretch B of a second belt 28.

The belt 27 travels towards the corner turn C and at the turn is guided downwardly as before, but instead of passing around an inclined guide roller in the advancing direction as in the form already described, it travels around a vertically inclined roller 29 in the reverse direction and up around a horizontally inclined guide roller 30 towards the beginning of the stretch A. Similarly the lower part of the belt 28 is guided downwardly adjacent to the turn C around a horizontally inclined guide roller 31 and then up around a vertically inclined guide roller 32 and around a guide member 33 into the plane of travel.

The belts 27 and 28 can be driven by any suitable means either at the same speed or obviously at different speeds if such might be advantageous.

It will also be clear that the delivery part B might be arranged at a lower level than the part A if such arrangement might be desired.

It will also be understood that while the drawings have shown the turn as a right angle turn, in practice the turn can be either more or less than a right angle.

In Figs. 7 to 10, inclusive, I have shown a single belt conveyer and a two belt conveyer, both arranged to turn a corner, and in both forms the corner turning means requires a minimum of vertical space beneath the conveyer belts.

These forms of the invention are especially useful when for some reason either because the belts are extra wide or for some other reason the former described mechanisms for turning the corner would require more vertical space beneath the conveyer that may be available.

The form shown in Figs. 7 and 8 consists of a single conveyer belt 42. One section 43 of the conveyer moves towards the corner turn C and the section 44 travels away from the corner. At the diagonal line C of the turn, the belt 42 is guided down out of the plane of travel around a diagonally arranged guide 45 and out to the left just beneath the support plate 46 as shown at 47. The conveyer belt is trained around a horizontally arranged guide roller 48, and back beneath the part 47 to the diagonal line C where it is guided up substantially into the plane of the first section 43 by a diagonal guide 49. It should be noted that in practice, section 44 of the conveyer is only about one-eighth of an inch below the plane of the section 43. This is a less difference than can be shown in the drawings as the thickness of the conveyer has to be shown thicker than it actually is.

I preferably provide a second horizontal guide roller 50 adjacent to the roller 48 and over which the return part of the conveyer is trained to lift it up close to the part 47 and in position to be guided up into the normal plane of the conveyer as shown.

In Figs. 9 and 10, I have shown a form of the invention quite similar to that shown in Figs. 7 and 8, except that the two sections of the conveyer are constituted of two belts instead of only one.

In this form a conveyer belt 51 is provided which carries the articles to the turning line and a second belt 52 is provided for conveying the articles away from the turning line C.

The belt 51 as in the form shown in Fig. 7, at the turning line C is guided down out of the plane of travel around a fixed diagonal guide 53 and toward the left. It is trained around a horizontally arranged guide roller 54 and back toward the turning line, where it is trained around a diagonally arranged guide roller 55 by which it is guided away from the turning line back beneath the approaching part of the conveyer as shown at 56.

The delivery section 52 of the conveyer is similarly arranged in that its lower stretch 57 is guided around a diagonally arranged roller 58 similar to the roller 56 and extends out to the side of the conveyer 53 as shown at 58 where it is guided up around a horizontal guide roller 59 and back toward the turning line C. At the turning line C it is guided up into the plane of travel by a fixed diagonal guide 60 and then out to the right over the lower part as shown at 61.

In this latter form, as in the single belt form just described, the corner turning mechanism is all arranged so that it does not require very much vertical space beneath the plane of travel.

As many modifications of the invention will readily suggest themselves to one skilled in the art, I do not limit or confine the invention to the specific details of construction herein shown and described except within the scope of the appended claims.

I claim:

1. In a substantially flat belt conveyer system, two stretches extending at an angle to each other and in substantially the same plane at their adjacent ends, angularly disposed guides arranged at the adjacent ends of the stretches parallel with each other and close together and around which the stretches are respectively guided out of and into the plane of the conveyer, and other guide means associated with said angularly disposed guides for maintaining the stretches in a substantially uniform taut condition across their width.

2. The invention defined in claim 1, the two stretches being independent of each other.

3. In a conveyer of the kind described having two sections each consisting of a conveyer belt, the two sections arranged at an angle to each other, a pair of diagonal guides arranged at the adjacent ends of the sections, one of said diagonal guides arranged and adapted to guide the first section down out of the plane of travel, and the other diagonal guide arranged and adapted to guide the second section up into the plane of travel, and a horizontally arranged guide roller for each section arranged out at one side of the diagonally arranged guides for receiving the conveyers from said diagonal guides and guiding them back towards the sections, and a pair of horizontally arranged guide rollers one for each section arranged parallel to its respective diagonal guide for guiding the lower stretches of the sections beneath the upper stretches thereof.

4. In a conveying apparatus, the combination of an endless conveyer belt having an upper active portion and a lower return inactive portion, means for driving said belt, means for guiding the upper portion of said belt to provide adjacent work supporting runs thereof lying at an angle to each other the discharge end of the first run and the receiving end of the second run being located approximately in the same plane and close together, and connected by a downwardly extending loop, said guiding means including a guiding member holding said loop taut and disposed angularly both with reference to the direction of travel of said runs and also with reference to the plane of said runs, and similar means for guiding the lower or return portion of the conveyer belt to provide runs thereof extending beneath the runs of the active portion thereof and lying at a similar angle to each other, and connected by a downwardly extending loop, said guiding means for said lower portion also including guiding means holding said loop of the lower portion taut and disposed angularly both with reference to the direction of travel of said runs and also with reference to the planes of said runs.

5. In a substantially horizontal flat conveyer system, a conveyer belt having two active stretches extending at an angle to each other and in substantially the same plane, and two return stretches arranged respectively substantially beneath the active stretches, angularly disposed thin edged guides arranged at the adjacent ends of the active stretches parallel with each other and close together, around which the active stretches are respectively guided out of and into the plane of said active stretches, other angularly disposed guides parallel with each other and arranged beneath the active stretches adjacent to the adjacent ends of said active stretches around which the return stretches are guided, and other guide means associated with said angularly disposed guides for maintaining the stretches of said conveyer system in taut condition across their width at the angle turn.

6. In a substantially flat endless belt conveyer system, a conveyer belt having an upper active portion and a lower return inactive portion, and having two parts extending at an angle to each other, the adjacent ends of the two parts being in substantially the same plane, a pair of angularly disposed guides arranged at the adjacent ends of the two angularly disposed parts parallel with each other and around which the upper active portion of the conveyer belt is guided out of and into the plane thereof, and other guide means associated with said angularly disposed guides for maintaining the two angularly disposed parts of the active portion of the conveyer belt in a substantially uniform taut condition across their width, and a second pair of angularly disposed guides adjacent to the first said pair thereof for guiding the inactive portion of the conveyer belt out of and into the plane thereof, and other guide means associated with said second pair of angularly disposed guides for taking up the slack in the inactive portion of the conveyer between the angularly disposed guides thereof, the arrangement being such that the inactive or return portions of the conveyer belt are disposed below the active portions thereof throughout the length of same.

7. In a flat belt conveyer system of the kind described, two stretches extending at an angle to each other and in substantially the same plane, a pair of closely positioned, parallel, diagonally arranged conveyer guides for guiding one stretch out of and the other stretch into the plane of the conveyer, and means below said diagonal guides for taking up the slack at the corner turn.

ROBERT P. RASMUSSEN.